United States Patent [19]

Kindig et al.

[11] 4,276,081

[45] * Jun. 30, 1981

[54] PROCESS FOR BENEFICIATING ORES

[75] Inventors: James K. Kindig, Arvada; Ronald L. Turner, Golden, both of Colo.

[73] Assignee: Hazen Research, Inc., Golden, Colo.

[*] Notice: The portion of the term of this patent subsequent to Jun. 3, 1997, has been disclaimed.

[21] Appl. No.: 101,583

[22] Filed: Dec. 10, 1979

Related U.S. Application Data

[63] Continuation-in-part of Ser. No. 950,177, Oct. 10, 1978, abandoned.

[51] Int. Cl.³ .............................................. C22B 1/02
[52] U.S. Cl. .................................................. 75/7; 75/6; 75/21
[58] Field of Search .................. 75/1 R, 1 T, 6-9, 75/21, 28, 7277, 82, 87, 111, 122; 423/23, 138, 25; 209/8, 9, 212-214; 427/47, 252, 253, 255, 129, 132

[56] References Cited

U.S. PATENT DOCUMENTS

| | | | |
|---|---|---|---|
| 933,717 | 9/1909 | Lockwood et al. | 209/214 |
| 1,053,486 | 2/1913 | Ethenington | 75/1 R |
| 2,132,404 | 10/1938 | Dean | 423/25 |
| 2,332,309 | 10/1943 | Drummond | 427/252 |
| 2,612,440 | 9/1952 | Altmann | 75/0.5 |
| 2,944,883 | 7/1960 | Queneau et al. | 75/0.5 |
| 3,220,875 | 11/1965 | Queneau et al. | 427/47 |
| 3,252,791 | 5/1966 | Frysinger et al. | 75/119 |
| 3,323,903 | 6/1967 | O'Neill et al. | 75/0.5 |
| 3,466,167 | 9/1969 | Illis et al. | 75/112 |
| 3,490,899 | 1/1970 | Krivisky et al. | 423/25 |
| 3,669,644 | 6/1972 | Sato | 423/25 |
| 3,671,197 | 6/1972 | Mascio | 75/6 |
| 3,758,293 | 9/1973 | Viviani et al. | 75/6 |
| 3,926,789 | 12/1975 | Shubert | 209/214 |
| 3,938,966 | 2/1976 | Kindig et al. | 44/1 R |
| 4,056,386 | 11/1977 | McEwan et al. | 423/417 |
| 4,098,584 | 7/1978 | Kindig et al. | 44/1 R |
| 4,119,410 | 10/1978 | Kindig et al. | 44/1 R |
| 4,120,665 | 10/1978 | Kindig et al. | 44/1 R |
| 4,187,170 | 2/1980 | Westcott | 209/8 |
| 4,205,979 | 6/1980 | Kindig et al. | 209/214 |

FOREIGN PATENT DOCUMENTS

| | | | |
|---|---|---|---|
| 28375 | 7/1931 | Australia | 75/6 |
| 179095 | 7/1954 | Austria | 75/112 |
| 4527990 | 11/1980 | Canada | 75/6 |
| 119156 | 8/1959 | U.S.S.R. | 209/212 |

OTHER PUBLICATIONS

Henderson, J. G., et al., *Metallurgical Dictionary*, Rheinhold Publishing Corp., N. Y., p. 227 (1953).
Sinclair, J. S., *Coal Preparation and Power Supply at Collieres*, London, pp. 15–17, (1962).

*Primary Examiner*—Michael L. Lewis
*Attorney, Agent, or Firm*—Sheridan, Ross, Fields & McIntosh

[57] ABSTRACT

In a process for beneficiating one or more mineral values of sulfide ores and/or metal oxide ores selected from the group consisting of bauxite, taconite, apatite, titanium oxides and the metal oxides of Groups IIIB, IVB, VB, VIB, VIIB, VIIIB, IB, IIB and IVA by treating the ore with a metal containing compound under conditions such as to selectively enhance the magnetic susceptibility of the mineral values to the exclusion of the gangue in order to permit a separation between the values and gangue, the improvement comprising removing at least a portion of any elemental sulfur present from the ore prior to the treatment with a metal containing compound.

76 Claims, No Drawings

4,276,081

PROCESS FOR BENEFICIATING ORES

CROSS-RELATED PATENT APPLICATIONS

This application is a continuation-in-part application of U.S. Ser. No. 950,177 filed Oct. 10, 1978 now abandoned.

TECHNICAL FIELD

This invention relates to an improved means for treating sulfide or metal oxide ores to separate the mineral values from gangue material by selectively enhancing the magnetic susceptibility of the mineral values so that they may be magnetically removed from the gangue.

BACKGROUND ART

As is well-known, mining operations in the past for recovering various metals (e.g., lead and copper) have utilized high grade ore deposits where possible. Many of these deposits have been exhausted and mining of lower grade ores is increasing. The processing of these leaner ores consumes large amounts of time, labor, reagents, power and water with conventional processing.

In addition to the increased expense associated with the extraction of these metals from low grade ores, proposed processes for separation of certain of the sulfide ores are technically very difficult and involve elaborate and expensive equipment. In many cases the expense incurred by such separation would be greater than the commercial value of the metal, such that the mineral recovery, while theoretically possible, is economically unfeasible.

Our copending patent applications Ser. No. 086,830 filed Oct. 22, 1979 entitled "Process for Beneficiating Sulfide Ores" and Ser. No. 921,583 filed July 3, 1978 entitled "Process for Beneficiating Oxide Ores" teach the treatment of these ores with a metal containing compound under conditions such as to selectively enhance the magnetic susceptibility of the mineral values to the exclusion of the gangue, allowing for a separation of these values from the gangue. However, the presence of a particular impurity can have a profound effect on this type of process. More particularly, it has been found that the presence of elemental sulfur has an adverse effect on the recovery of mineral values in a process which enhances the magnetic susceptibility of the mineral values. Pretreating the raw ore to remove at least a portion of the elemental sulfur present, and thereafter selectively enhancing the magnetic susceptibility of the mineral values so that they may be physically separated from the gangue, substantially enhances the effectiveness of the separation of the mineral values from the gangue.

DISCLOSURE OF THE INVENTION

The process of the present invention entails beneficiating sulfide ores or metal oxide ores selected from the group consisting of bauxite, taconite, apatite, titanium oxides and the metal oxides of groups IIIB, IVB, VB, VIB, VIIB, VIIIB, IB, IIB and IVA containing elemental sulfur by pretreating the ore to remove at least a portion of the elemental sulfur, and thereafter treating the ore with a metal containing compound under conditions such as to selectively enhance the magnetic susceptibility of the mineral values to the exlcusion of the gangue, thereby permitting the removal of these values from the gangue. The pretreatment for removing the elemental sulfur may be performed by any suitable means, including, for example, heat pretreatment, steam pretreatment, solvent extraction and chemical reaction.

BEST MODE FOR CARRYING OUT THE INVENTION

The process of the present invention is particularly useful for concentrating sulfide or metal oxide minerals from ore mixtures containing sufficient elemental sulfur such that the sulfur interferes with the interaction of the metal containing compound and the mineral values. The process entails the pretreatment to remove elemental sulfur from the ore, thereafter treating the ore with a metal containing compound in order to selectively enhance the magnetic susceptibility of various mineral values contained within the ore. The treated mixture can then be treated by magnetic means to produce a beneficiated product.

The connection of elemental sulfur in sulfide ores varies greatly, and may range from less than one part per million to greater than 8,000 parts per million. Although many metal oxide ores do not contain elemental sulfur in their naturally occurring state, a number of such ores do exist in the presence of varying amounts of elemental sulfur. This wide range is dependent upon the type of ore and the particular mineral deposit. Concentrations of elemental sulfur as small as one part per million, at least in some ores, are sufficient to hinder the selective magnetic susceptibility enhancement reaction. Higher concentrations of elemental sulfur generally create a greater hindrance. Therefore, essentially any removal of elemental sulfur prior to performing the magnetic susceptibility enhancement treatment improves the recovery of mineral values. Preferably the concentration of elemental sulfur following treatment for its removal will be less than about 100 parts per million, more preferably less than about 50 parts per million and most preferably less than about 10 parts per million, based on the total weight of the ore being treated.

Essentially any process for removing elemental sulfur from the ore can be utilized as the pretreatment means. Examples of suitable processes include heat treatment, steam treatment and solvent extraction.

The heat pretreatment essentially comprises heating the ore in order to remove the elemental sulfur. It is generally preferred that the pretreatment comprise heating the ore to a temperature of from about 80° C., to about 500° C., more preferably to a temperature of from about 150° C. to about 350° C., and most preferably to a temperature of from about 175° C. to about 250° C. This heat pretreatment is preferably maintained for at least about 0.1 hour and more preferably for at least about 0.5 hours. Generally higher temperatures necessitate shorter periods of time in order to accomplish the pretreatment.

The heat pretreatment step may be conducted in the presence of one or more gaseous additives, and this is preferably under many circumstances. Examples of suitable gaseous additives include nitrogen, steam, carbon monoxide, carbon dioxide, ammonia, methane, air, ethane, propane, butane and other hydrocarbon compounds which exist in the gaseous state at the pretreatment temperature. Some of these additives, under certain conditions, serve as chemical reactants in removing elemental sulfur.

When these additives are employed, it is preferable that they be employed in an amount of at least about 2, more preferably at least about 12 and most preferably at least about 120 cubic meters per hour per metric ton of ore being processed.

A particularly preferred additive is steam. Heat pretreatment with steam is preferably conducted within a temperature range of from about 100° C. to about 500° C. and more preferably from about 150° C. to about 350° C. and most preferably from about 175° C. to about 250° C. Preferably the pretreatment should be conducted for at least about 0.1 hours, more preferably for at least about 0.25 hours and most preferably for at least about 0.5 hours. The amount of water preferably ranges from about 1 weight percent to about 50 weight percent, more preferably from about 5 weight percent to about 30 weight percent and most preferably from about 10 weight percent to about 25 weight percent, based on the weight of the ore being treated.

Alternatively, the ore can be pretreated with a solvent or a combination of solvents to effect elemental sulfur removal. Examples of suitable solvents include petroleum ether, carbon tetrachloride, toluene, acetone, ethyl alcohol, methyl alcohol, ether, carbon disulfide, liquid ammonia and other compounds suitable to dissolve elemental sulfur. Preferred solvents include carbon tetrachloride, petroleum ether, toluene and acetone.

The amount of a particular solvent used will be dependent on the degree of solubility the elemental sulfur exhibits in the solvent at the treatment temperature. Generally, it is preferable that the solvent be employed in an amount of at least about one half, more preferably at least about 3 and most preferably at least about 10 liters per kilogram of ore.

After the initial pretreatment step to remove the elemental sulfur, the ore is treated to selectively enhance the magnetic susceptibility of the mineral values.

"Enhancing the magnetic susceptibility" of the ore as used herein is intended to be defined in accordance with the following discussion. Every compound of any type has a specifically defined magnetic susceptibility, which refers to the overall attraction of the compound to a magnetic force. An alteration of the surface magnetic characteristics will alter the magnetic susceptibility. The metal treatment of the inventive process alters the surface characteristics of the ore particles in order to enhance the magnetic susceptibility of the particles. It is to be understood that the magnetic susceptibility of the original particle is not actually changed, but the particle itself is changed at least at its surface, resulting in a particle possessing a greater magnetic susceptibility than the original particle. For convenience of discussion, this alteration is termed herein as "enhancing the magnetic susceptibility" of the particle or ore itself.

The sulfide minerals which are capable of undergoing a selective magnetic enhancement in accordance with the process include the metal sulfides of Groups VIB, VIIB, VIIIB, IB, IIB, IIIA, IVA and VA. These sulfides preferably specifically include the sulfides of molybdenum, tungsten, manganese, rhenium, iron, ruthenium, osmium, cobalt, rhodium, iridium, nickel, palladium, platinumm, copper, gold, silver, zinc, cadmium, mercury, tin, lead, arsenic, antimony and bismuth.

The metal oxide minerals which are capable of undergoing a selective magnetic enhancement in accordance with the process include the metal oxides of Groups IIIB, IVB, VB, VIB, VIIB, VIIIB, IB, IIB and IVA, the titanium oxides of Group IVB, aluminum hydrate, i.e., bauxite, of Group IIIA, taconite, chrysocolla and apatite. It is recognized that taconite and chrysocolla are classified as silicates and apatite is classified as a phosphate, and it is further recognized that apatite does not contain elements generally classified as metals (other than calcium). However, for the purposes of this inventive process they are classified as metal oxides. The preferred oxide minerals include bauxite, apatite, cuprite, cassiterite, carnotite, scheelite, chrysocolla and hematite.

The gangue minerals from which the metal sulfides and metal oxides can be separated include those minerals which do not undergo a sufficient magnetic susceptibility enhancement as a result of the process. These gangue minerals include, for example, silica, alumina, gypsum, muscovite, dolomite, calcite, albite and feldspars, as well as various other minerals. The term gangue as used herein refers to inorganic minerals with which sulfide and oxide ores are normally associated. The term does not include coal.

In those ores which contain naturally relatively strongly magnetic constituents, such as magnetite, the magnetic material may first be removed by passing the mixture through a magnetic separator. The nonmagnetic portion obtained by this precleaning step is then subjected to the pretreatment for sulfur removal and treatment with a metal containing compound to enhance the magnetic susceptibility.

Prior to the sulfur removal pretreatment or treatment with the metal containing compound, the ore must be ground to liberate the metal sulfide or metal oxide particles from the gangue particles, if the respective components do not already exist in this liberated state. The ore may be crushed finer than necessary to achieve liberation, but this is not generally economically feasible. It is generally satisfactory to crush the ore to at least about minus 14 mesh, although many ores require grinding to minus 65 mesh or finer.

Numerous metal containing compounds are capable of enhancing the magnetic susceptibility of the metal sulfides and metal oxides in accordance with the invention. Many iron containing compounds possess the capability of enhancing the magnetic susceptibility of the mineral values of the ore, as long as the compound is adaptable so as to bring the iron in the compound into contact with the mineral value under conditions such as to cause an alteration of at least a portion of the surface of the mineral value.

Iron containing compounds capable of exerting sufficient vapor pressure, with iron as a component in the vapor, so as to bring the iron into contact with the value at the reacton temperature are suitable, as well as other organic and inorganic iron containing compounds which can be dissolved and/or "dusted" and brought into contact with the mineral value contained within the ore. Preferred compounds within the vapor pressure group are those which exert a vapor pressure, with iron as a component in the vapor, of at least about 10 millimeters of mercury, more preferably of at least about 25 millimeters of mercury and most preferably of at least about 50 millimeters of mercury at the reaction temperature. Examples of groupings which fall within this vapor pressure definition include ferrocene and its derivatives and beta-diketone compounds of iron. Specific examples include ferrocene and iron acetylacetonate.

Other organic compounds which may be utilized to enhance the magnetic susceptibility include those which may be homogeneously mixed with a carrier liquid and brought into contact with the components of the ore. Such mixtures include, for example, solutions, suspensions and emulsions. These mixtures must be such as to provide sufficient metal to contact the surface of the mineral value. Suitable carrier liquids include, for example, acetone, petroleum ether, naphtha, hexane, benzene and water; but this, of course, is dependent upon the particular metal compound being employed. Specific groupings include, for example, ferrocene and its derivatives and the carboxylic acid salts of iron, such as, iron octoate, iron naphthenate, iron stearate and ferric acetylacetonate.

Additionally, solid organic iron containing compounds capable of being directly mixed with the ore in solid form possess the capability of enhancing the magnetic susceptibility of the metal sulfides and metal oxides. The compound must be in solid form at the mixing temperature and be of sufficiently fine particles size in order to be able to be well dispersed throughout the ore. The particle size is preferably smaller than about 20 mesh, more preferably smaller than about 100 mesh and most preferably smaller than about 400 mesh. Compounds within this grouping include ferrocene and its derivatives, iron salts of organic acids, and beta-diketone compounds of iron. Specific examples include ferrous formate, 1,1'-diacetyl ferrocene, and 1,1'-dihydroxymethyl ferrocene.

Various inorganic compounds are also capable of producing an enhanced magnetic susceptibility. Preferred inorganic compounds include ferrous chloride, ferric chloride and the metal carbonyls, including, for example, iron, nickel, cobalt, molybdenum, tungsten and chromium carbonyls and derivatives of these compounds. Iron carbonyl is a preferred carbonyl for imparting this magnetic susceptibility, particularly iron pentacarbonyl, iron dodecacarbonyl and iron nonacarbonyl. The more preferred metal containing compounds capable of enhancing the magnetic susceptibility are iron pentacarbonyl, ferrocene and ferric acetylacetonate, with iron pentacarbonyl being the most preferred.

The process is applied by contacting the iron containing compound with the ore at a temperature wherein the iron containing compound selectively decomposes or otherwise reacts at the surface of the metal sulfide or metal oxide particles to alter their surface characteristics, while remaining essentially unreactive, or much less reactive, at the surface of the gangue particles. The temperature of the reaction is a critical parameter, and dependent primarily upon the particular compound and the particular ore. The preferred temperature can be determined by heating a sample of the specific iron containing compound and the specific ore together until the decomposition reaction occurs. Suitable results generally occur over a given temperature range for each system. Generally, temperatures above the range cause non-selective decomposition while temperatures below the range are insufficient for the reaction to occur.

While as indicated above, techniques other than vapor injection methods may be employed as applicable depending upon the metal containing compound being utilized, the following discussion primarily applies to vapor injection techniques, specifically iron pentacarbonyl, as these are generally preferred. Similar considerations, as can be appreciated, apply to the other described techniques.

The preferred temperatures when iron pentacarbonyl is employed as the treating gas are primarily dependent upon the ore being treated. It is generally preferred to select a temperature which is within a range of 125° C., more preferably 50° C. and most preferably 15° C. less than the general decomposition temperature of the iron carbonyl in the specific system. The general decomposition temperature is intended to mean the temperature at which the iron carbonyl decomposes into iron and carbon monoxide in indiscriminate fashion, causing a magnetic enhancement of the gangue as well as the metal sulfide or metal oxide. The "specific system" is intended to include all components and parameters, other than, of course, temperature, of the precise treatment, as the general decomposition temperature varies with different components and/or different parameters. This decomposition temperature range can be readily determined by analytical methods and often a trial and error approach is preferred to determine the precise temperature range for each specific system.

The amount of the metal containing compound used and the time of treatment can be varied to maximize the selective enhancement treatment. With respect to iron carbonyl the preferred amount employed is from about 0.1 to about 100 kilograms per metric ton of feed, more preferably from about 1 to about 50 kilograms per metric ton of feed, and most preferably from about 2 to 20 kilograms per metric ton of feed. The treatment reaction is generally conducted for a period of time of from about 0.05 to about 4 hours, more preferably from about 0.15 to about 2 hours and most preferably from about 0.25 to about 1 hour.

After the feed mixture containing the metal sulfide or metal oxide values has been treated with a metal containing compound, it can then be subjected to a magnetic separation process to effect the separation of the sulfides or mineral value of the metal oxides. Any of many commercially available magnetic separators can be used to remove these values from the gangue. For example, low or medium intensity separations can be made with a permanent magnetic drum separator, electromagnetic drum separators, induced roll separators, or other configurations known to those skilled in the art. Since most sulfides are liberated at a mesh size of 65 mesh or finer, a wet magnetic separation process is more effective. Thus, high intensity, high gradient wet magnetic separators are preferred for the sulfides. Also electrostatic techniques may be employed as the primary separation means, or in addition to the magnetic separation means. The selective change in surface characteristics changes the electrical conductivity of the particle in analogous fashion to changing the particle's magnetic characteristics. Additionally, due to the fact that the sulfide or metal oxide surface characterisitcs have been selectively altered, the sulfides or metal oxides are often more amenable to processes such as flotation and chemical leaching.

EXAMPLE 1

Two sets of experiments were made with two different synthetic ores, 5 percent molybdenite and 3 percent sphalerite, both mixed with Ottawa sand. The first set of these samples were all treated for 30 minutess with 8 kilograms of iron carbonyl per metric ton of feed. The molybdenite ore was treated at a temperature of 140° C., whereas the sphalerite ore was treated at 135° C. The second set of samples were treated exactly the same as the first set with the exception that prior to the treatment the elemental sulfur present with the sulfides was removed by prolonged refluxing with petroleum ether. All the samples were subjected to a wet magnetic separation process, and the analyses of the products thus obtained are presented in Table 1.

TABLE 1

| Mineral | Elemental Sulfur, ppm in Mineral | Product | Weight (%) | Grade (%) | Metal | Metal Distr. (%) |
|---|---|---|---|---|---|---|
| Molybdenite | 75 | Magnetic | 8.6 | 2.10 | Mo | 90.8 |
| | | Nonmagnetic | 91.4 | 0.02 | Mo | 9.2 |
| | | Calculated Feed | 100.0 | 0.20 | Mo | 100.0 |
| Molybdenite | Removed | Magnetic | 4.9 | 3.35 | Mo | 81.2 |
| | | Nonmagnetic | 95.1 | 0.04 | Mo | 18.8 |
| | | Calculated Feed | 100.0 | 0.20 | Mo | 100.0 |
| Sphalerite | 387 | Magnetic | 14.3 | 4.20 | Zn | 67.3 |
| | | Nonmagnetic | 85.7 | 0.34 | Zn | 32.7 |
| | | Calculated Feed | 100.0 | 0.89 | Zn | 100.0 |
| Sphalerite | Removed | Magnetic | 6.7 | 3.35 | Zn | 85.7 |
| | | Nonmagnetic | 93.3 | 0.04 | Zn | 14.3 |
| | | Calculated Feed | 100.0 | 0.26 | Zn | 100.0 |

EXAMPLE 2

Samples of different minerals were ground to minus 65 mesh and mixed with minus 65 mesh silica sand to produce 3 percent synthetic ores. There were two sets of each sample. The first set was treated for 30 minutes with 8 kilograms of iron carbonyl per metric ton of feed. The second set of samples was pretreated to remove elemental sulfur by extraction with hot petroleum ether, followed by treatment with iron carbonyl under the same conditions as the first set. The temperature of the iron carbonyl treatment varied for the different minerals and is given in Table 2, along with the comparative results of the tests.

TABLE 2

| Mineral | Elemental Sulfur in Mineral (ppm) | Temperature Of Fe(CO)$_5$ Treatment (°C.) | Product | Weight (%) | Grade (%) | Metal | Metal Distr. (%) |
|---|---|---|---|---|---|---|---|
| Bornite | 1 | 140 | Magnetic | 3.6 | 29.7 | 4 | 78.3 |
| | | | Nonmagnetic | 96.4 | 0.313 | Cu | 21.7 |
| | | | Calculated Feed | 100.0 | 1.38 | Cu | 100.0 |
| Bornite | Removed | 140 | Magnetic | 1.9 | 44.5 | Cu | 62.3 |
| | | | Nonmagnetic | 98.1 | 0.530 | Cu | 37.7 |
| | | | Calculated Feed | 100.0 | 1.38 | Cu | 100.0 |
| Cinnabar | 1 | 190 | Magnetic | 1.6 | 48.1 | Hg | 43.9 |
| | | | Nonmagnetic | 98.4 | 1.0 | Hg | 56.1 |
| | | | Calculated Feed | 100.0 | 1.75 | Hg | 100.0 |
| Cinnabar | Removed | 190 | Magnetic | 1.7 | 54.5 | Hg | 54.1 |
| | | | Nonmagnetic | 98.3 | [0.8][1] | Hg | 45.9 |
| | | | Calculated Feed | 100.0 | [1.71] | Hg | 100.0 |
| Arsenopyrite | 4 | 125 | Magnetic | 7.4 | 1.01 | As | 31.0 |
| | | | Nonmagnetic | 92.6 | 0.18 | As | 69.0 |
| | | | Calculated Feed | 100.0 | 0.24 | As | 100.0 |
| Arsenopyrite | Removed | 125 | Magnetic | 4.4 | 1.56 | As | 47.3 |
| | | | Nonmagnetic | 95.6 | 0.08 | As | 52.7 |
| | | | Calculated Feed | 100.0 | 0.14 | As | 100.0 |
| Smaltite | 4 | 115 | Magnetic | 1.2 | 5.37 | Co | 22.1 |
| | | | Nonmagnetic | 98.8 | 0.23 | Co | 77.9 |
| | | | Calculated Feed | 100.0 | 0.29 | Co | 100.0 |
| Smaltite | Removed | 115 | Magnetic | 0.9 | 5.04 | Co | 31.4 |
| | | | Nonmagnetic | 99.1 | 0.10 | Co | 68.6 |
| | | | Calculated Feed | 100.0 | 0.14 | Co | 100.0 |
| Smaltite | 4 | 115 | Magnetic | 1.2 | 3.35 | Ni | 22.5 |
| | | | Nonmagnetic | 98.8 | 0.14 | Ni | 77.5 |
| | | | Calculated Feed | 100.0 | 0.18 | Ni | 100.0 |
| Smaltite | Removed | 115 | Magnetic | 0.9 | 3.37 | Ni | 30.4 |
| | | | Nonmagnetic | 99.1 | 0.07 | Ni | 69.6 |
| | | | Calculated Feed | 100.0 | 0.10 | Ni | 100.0 |
| Chalcocite | 4 | 140 | Magnetic | 3.4 | 50.8 | Cu | 90.5 |
| | | | Nonmagnetic | 96.6 | 0.188 | Cu | 9.5 |
| | | | Calculated Feed | 100.0 | 1.89 | Cu | 100.0 |
| Chalcocite | Removed | 140 | Magnetic | 2.7 | 55.8 | Cu | 86.8 |
| | | | Nonmagnetic | 97.3 | 0.242 | Cu | 13.2 |
| | | | Calculated Feed | 100.0 | 1.74 | Cu | 100.0 |
| Chalcopyrite | 110 | 140 | Magnetic | 1.8 | 20.5 | Cu | 48.4 |
| | | | Nonmagnetic | 98.2 | 0.401 | Cu | 51.6 |
| | | | Calculated Feed | 100.0 | 0.77 | Cu | 100.0 |
| Chalcopyrite | Removed | 140 | Magnetic | 2.5 | 20.0 | Cu | 63.5 |
| | | | Nonmagnetic | 97.5 | 0.295 | Cu | 36.5 |
| | | | Calculated Feed | 100.0 | 0.78 | Cu | 100.0 |
| Orpiment | 823 | 110 | Magnetic | 20.1 | 2.0 | As | 40.0 |
| | | | Nonmagnetic | 79.9 | 0.74 | As | 60.0 |
| | | | Calculated Feed | 100.0 | 0.99 | As | 100.0 |
| Orpiment | Removed | 110 | Magnetic | 26.5 | 2.06 | As | 49.7 |
| | | | Nonmagnetic | 73.5 | 0.75 | As | 50.3 |

TABLE 2-continued

| Mineral | Elemental Sulfur in Mineral (ppm) | Temperature Of Fe(CO)$_5$ Treatment (°C.) | Product | Weight (%) | Grade (%) | Metal | Metal Distr. (%) |
|---|---|---|---|---|---|---|---|
|  |  |  | Calculated Feed | 100.0 | 1.10 | As | 100.0 |
| Realgar | 439 | 95 | Magnetic | 23.2 | 2.02 | As | 36.5 |
|  |  |  | Nonmagnetic | 76.8 | 1.06 | As | 63.5 |
|  |  |  | Calculated Feed | 100.0 | 1.28 | As | 100.0 |
| Realgar | Removed | 95 | Magnetic | 22.3 | 1.13 | As | 27.4 |
|  |  |  | Nonmagnetic | 77.7 | 0.86 | As | 72.6 |
|  |  |  | Calculated Feed | 100.0 | 0.92 | As | 100.0 |
| Pentlandite in Pyrrhotite | 4558 | 105 | Magnetic | 18.2 | 0.733 | Ni | 67.4 |
|  |  |  | Nonmagnetic | 81.8 | 0.079 | Ni | 32.6 |
|  |  |  | Calculated Feed | 100.0 | 0.198 | Ni | 100.0 |
| Pentlandite in Pyrrhotite | Removed | 105 | Magnetic | 2.8 | 5.18 | Ni | 80.6 |
|  |  |  | Nonmagnetic | 97.2 | 0.036 | Ni | 19.4 |
|  |  |  | Calculated Feed | 100.0 | 0.180 | Ni | 100.0 |
| Stibnite | 8081 | 85 | Magnetic | 7.6 | 4.82 | Sb | 47.8 |
|  |  |  | Nonmagnetic | 92.4 | 0.43 | Sb | 52.2 |
|  |  |  | Calculated Feed | 100.0 | 0.77 | Sb | 100.0 |
| Stibnite | Removed | 85 | Magnetic | 1.3 | 9.80 | Sb | 43.7 |
|  |  |  | Nonmagnetic | 98.7 | 0.17 | Sb | 56.3 |
|  |  |  | Calculated Feed | 100.0 | 0.30 | Sb | 100.0 |
| Tetrahedrite | 24 | 117 | Magnetic | 2.9 | 4.43 | Cu | 58.8 |
|  |  |  | Nonmagnetic | 97.1 | 0.06 | Cu | 31.2 |
|  |  |  | Calculated Feed | 100.0 | 0.19 | Cu | 100.0 |
| Tetrahedrite | Removed | 117 | Magnetic | 2.8 | 4.80 | Cu | 73.4 |
|  |  |  | Nonmagnetic | 97.2 | 0.05 | Cu | 26.6 |
|  |  |  | Calculated Feed | 100.0 | 0.18 | Cu | 100.0 |
| Tetrahedrite | 24 | 117 | Magnetic | 2.9 | 0.256 | Zn | 31.0 |
|  |  |  | Nonmagnetic | 97.1 | 0.017 | Zn | 69.0 |
|  |  |  | Calculated Feed | 100.0 | 0.024 | Zn | 100.0 |
| Tetrahedrite | Removed | 117 | Magnetic | 2.8 | 0.287 | Zn | 67.4 |
|  |  |  | Nonmagnetic | 97.2 | 0.004 | Zn | 32.6 |
|  |  |  | Calculated Feed | 100.0 | 0.012 | Zn | 100.0 |
| Tetrahedrite | 24 | 117 | Magnetic | 2.9 | 0.78 | Ag | 85.3 |
|  |  |  | Nonmagnetic | 97.1 | 0.004 | Ag | 14.7 |
|  |  |  | Calculated Feed | 100.0 | 0.027 | Ag | 100.0 |
| Tetrahedrite | Removed | 117 | Magnetic | 2.8 | 0.97 | Ag | 73.4 |
|  |  |  | Nonmagnetic | 97.2 | 0.010 | Ag | 26.6 |
|  |  |  | Calculated Feed | 100.0 | 0.037 | Ag | 100.0 |
| Tetrahedrite | 24 | 117 | Magnetic | 2.9 | 2.34 | Sb | 53.4 |
|  |  |  | Nonmagnetic | 97.1 | 0.061 | Sb | 46.6 |
|  |  |  | Calculated Feed | 100.0 | 0.127 | Sb | 100.0 |
| Tetrahedrite | Removed | 117 | Magnetic | 2.8 | 2.47 | Sb | 87.7 |
|  |  |  | Nonmagnetic | 97.2 | 0.010 | Sb | 12.3 |
|  |  |  | Calculated Feed | 100.0 | 0.078 | Sb | 100.0 |

[1]Values in brackets are calculated from other analyses

EXAMPLE 3

Four samples of a synthetic 3 percent stibnite ore were prepared by mixing minus 65 mesh stibnite ore with minus 65 mesh silica sand. The resultant 3 percent stibnite ore contained 274 parts per million of elemental sulfur. One sample received no pretreatment and was treated with 8 kilograms of iron pentacarbonyl per metric ton of sample at a temperature of 85° C. for 30 minutes.

The other samples were pretreated with steam, hot air or petroleum ether to effect the removal of elemental sulfur and then treated with iron pentacarbonyl in the same manner as the first sample.

The steam pretreatment consisted of treating the sample with 250 kilograms of steam per metric ton of sample at a temperature of 200° C. for one hour. The pretreatment with hot air to remove elemental sulfur was accomplished by spreading the sample in a thin layer in metal pans and placing these pans in a forced air drying oven having a temperature of 225° C. for two hours. The petroleum ether pretreatment consisted of removing elemental sulfur from a sample through four extractions with this solvent.

All of the samples, after the iron carbonyl treatment, were subjected to a wet magnetic separation process. Analyses of the resulting products are given in Table 3.

TABLE 3

| Pre-treatment | Elemental Sulfur (ppm) | Product | Weight (%) | Grade (%) | Antimony Distr. (%) |
|---|---|---|---|---|---|
| None | 274 | Magnetic | 8.1 | 3.56 | 63.4 |
|  |  | Nonmagnetic | 91.9 | 0.181 | 36.6 |
|  |  | Calculated Feed | 100.0 | 0.45 | 100.0 |
| Steam | 1 | Magnetic | 1.24 | 27.7 | 58.1 |
|  |  | Nonmagnetic | 98.76 | 0.251 | 41.9 |
|  |  | Calculated Feed | 100.0 | 0.59 | 100.0 |
| Hot Air | 1 | Magnetic | 0.78 | 20.1 | 57.9 |
|  |  | Nonmagnetic | 99.22 | 0.115 | 42.1 |
|  |  | Calculated Feed | 100.0 | 0.27 | 100.0 |
| Petroleum Ether Extraction | 75 | Magnetic | 2.17 | 8.78 | 64.3 |
|  |  | Nonmagnetic | 97.83 | 0.108 | 35.7 |
|  |  | Calculated Feed | 100.0 | 0.30 | 100.0 |

EXAMPLE 4

Samples of a synthetic 3 percent galena ore were prepared by mixing minus 65 mesh galena ore with minus 65 mesh silica sand. The resultant 3 percent galena ore contained 26 parts per million of elemental sulfur. One sample received no pretreatment and was treated with 8 kilograms of iron pentacarbonyl per metric ton of sample at a temperature of 120° C. for 30 minutes.

The other samples were pretreated with steam, hot air, petroleum ether or heat plus nitrogen to effect the removal of elemental sulfur, and then treated with iron pentacarbonyl in the same manner as the first sample. The steam, hot air and petroleum ether pretreatments were done in the same manner as described in Example 3. The pretreatment with heat and nitrogen consisted of passing nitrogen through the reactor at a flow rate of one reactor volume of gas every 4.3 minutes. These conditions were maintained for one hour.

All of the samples, after the iron carbonyl treatment, were subjected to a wet magnetic separation process. Analyses of the resulting products are given in Table 4.

TABLE 4

| Pretreatment | Elemental Sulfur (ppm) | Product | Weight (%) | Grade (%) | Lead Distr. (%) |
|---|---|---|---|---|---|
| None | 26 | Magnetic | 7.3 | 20.9 | 81.7 |
|  |  | Nonmagnetic | 92.7 | 0.370 | 18.3 |
|  |  | Calculated Feed | 100.0 | 1.87 | 100.0 |
| Petroleum Ether Extraction | 4 | Magnetic | 2.3 | 23.8 | 78.1 |
|  |  | Nonmagnetic | 97.7 | 0.157 | 21.9 |
|  |  | Calculated Feed | 100.0 | 0.700 | 100.0 |
| Hot Air | <1 | Magnetic | 0.51 | 29.6 | 19.0 |
|  |  | Nonmagnetic | 99.49 | 0.645 | 81.0 |
|  |  | Calculated Feed | 100.0 | 0.790 | 100.0 |
| Steam | <1 | Magnetic | 2.3 | 25.5 | 79.8 |
|  |  | Nonmagnetic | 97.7 | 0.152 | 20.2 |
|  |  | Calculated Feed | 100.0 | 0.74 | 100.0 |
| Heat and $N_2$ | — | Magnetic | 3.6 | 12.0 | 58.3 |
|  |  | Nonmagnetic | 96.4 | 0.321 | 41.7 |
|  |  | Calculated Feed | 100.0 | 0.74 | 100.0 |

EXAMPLE 5

A 150 gram sample of synthetic scheelite ore was made by blending minus 65 mesh scheelite ore (3 percent) in minus 65 mesh silica sand. Since the scheelite ore contained only trace amounts of sulfur, 50 parts per million of sulfur was added to the sample by dissolving 0.0075 grams of sulfur in petroleum ether, mixing the sulfur solution with the ore and evaporating the ether.

A 50 gram split of this sulfur spiked ore was treated with iron pentacarbonyl in a rotary glass reactor at a temperature of 135° C. for 30 minutes. The iron carbonyl was injected during the first ten minutes of the treatment at a dosage of 8 kilograms of iron pentacarbonyl per metric ton of feed. The reactor was purged prior to and following this treatment with nitrogen gas.

The remaining 100 grams of scheelite ore was exposed to a hot air pretreatment. The material was spread in a 9 inch stainless steel pan and placed in a drying oven at a temperature of 225° C. for two hours. The sample was split with one split being used for the analysis of elemental sulfur and the other split being treated with iron carbonyl. The iron pentacarbonyl treatment was conducted at 135° C. for 30 minutes with a dosage of 8 kilograms of iron carbonyl per metric ton of sample being injected during the first ten minutes of the treatment. Again, the reactor was purged prior to and following the treatment with a stream of nitrogen gas. All of the samples were subjected to a wet magnetic separation process and analyses of the products thus obtained are presented below in Table 5.

TABLE 5

| Test | Sulfur Contained in Mineral (ppm) | Product | Weight (%) | Grade (%) | Tungsten Distr. (%) |
|---|---|---|---|---|---|
| Spiked with sulfur, no pretreatment | 50 | Magnetic | 42.2 | 0.46 | 43.9 |
|  |  | Nonmagnetic | 57.8 | 0.43 | 56.1 |
|  |  | Calculated Feed | 100.0 | 0.44 | 100.0 |
| Spiked with sulfur, and pretreated | <1 | Magnetic | 27.0 | 0.80 | 48.8 |
|  |  | Nonmagnetic | 73.0 | 0.31 | 51.2 |
|  |  | Calculated Feed | 100.0 | 0.44 | 100.0 |

What is claimed is:

1. In a process for beneficiating sulfide ores and metal oxide ores from gangue, excluding coal, wherein the metal oxide ore is selected from the group consisting of bauxite, apatite, and the metal oxides of Groups IIB, IVB, VB, VIB, VIIB, VIIIB, IB, IIB and IVA, which contain elemental sulfur, wherein the ore is treated with a metal containing compound under conditions which cause the metal containing compound to react substantially at the surface of the metal sulfide or oxide particles to the substantial exclusion of the gangue particles so as to alter the surface characteristics of the metal values thereby causing a selective enhancement of the magnetic susceptibility of one or more metal sulfide or oxide values of the ore to the exclusion of the gangue in order to permit a physical separation between the values and the gangue, the improvement comprising:
removing at least a portion of the elemental sulfur from the ore prior to its treatment with the metal containing compound.

2. The process of claim 1 wherein the means for removing the elemental sulfur comprises heating the ore to a temperature of from about 80° C. to about 500° C. for a time period of at least about 0.1 hours.

3. The process of claim 2 wherein the heat pretreatment step is conducted in the presence of a gas selected from the group consisting of nitrogen, steam, carbon monoxide, carbon dioxide, ammonia, air, methane, ethane, propane, butane and other hydrocarbon compounds which exist in the gaseous state at the pretreatment temperature.

4. The process of claim 3 wherein the gas is steam.

5. The process of claim 4 wherein the steam pretreatment is conducted within a temperature range of from about 100° C. to about 500° C. for at least about 0.1 hours with from about 1 weight percent to about 50 weight percent water, based on the weight of the ore being treated.

6. The process of claim 1 wherein the means for removing elemental sulfur comprises solvent extraction.

7. The process of claim 6 wherein the solvent is selected from the group consisting of petroleum ether, carbon tetrachloride, toluene, acetone, ethyl alcohol, methyl alcohol, ether, carbon disulfide and liquid ammonia.

8. The process of claim 2 or claim 7 wherein the elemental sulfur concentration of the ore following the pretreatment for the removal of elemental sulfur is less than about 100 parts per million.

9. The process of claim 2 or claim 7 wherein the elemental sulfur concentration following the pretreatment for the removal of elemental sulfur is less than about 50 parts per million.

10. In a process for the beneficiation of a metal sulfide ore or a metal oxide ore from gangue, excluding coal, wherein the metal oxide ore is selected from the group consisting of bauxite, apatite, and the metal oxides of Groups IVB, VB, VIB, VIIB, VIIIB, IB, IIB and IVA, which contain elemental sulfur, wherein the ore is treated with from 0.1 to about 100 kilograms of a metal containing compound per metric ton of ore at a temperature within the range of 125° C. less than the general decomposition temperature of the metal containing compound in a specific system for the ore being treated for a period of time of from about 0.05 to about 4 hours to cause the metal containing compound to react substantially at the surface of the metal sulfide or oxide particles to the substantial exclusion of the gangue particles so as to alter the surface characteristics of the metal values thereby causing a selective enhancement of the magnetic susceptibility of one or more metal sulfide or oxide values contained in the ore to the exclusion of the gangue so as to permit a separation between the values and the gangue, the improvement comprising:

removing at least a portion of the elemental sulfur from the ore prior to its treatment with the metal containing compound.

11. The process of claim 1 or claim 10 wherein the metal containing compound is an iron containing compound.

12. The process of claim 11 wherein the iron containing compound is selected from the group consisting of ferrous chloride, ferric chloride, ferrocene, ferrocene derivatives, ferrous acetylacetonate, ferric acetylacetonate, ferric acetylacetonate derivatives and iron carbonyls.

13. The process of claim 12 wherein the means for removing the elemental sulfur comprises heating the ore to a temperature of from about 80° C. to about 500° C. for a period of time of at least about 0.1 hours.

14. The process of claim 13 wherein the heat pretreatment step is conducted in the presence of a gas selected from the group consisting of nitrogen, steam, carbon monoxide, carbon dioxide, ammonia, methane, air, ethane, propane, butane and other hydrocarbon compounds in the gaseous state at the pretreatment temperature.

15. The process of claim 14 wherein the gas comprises steam at a temperature of from about 150° C. to about 350° C. for a time period of at least about 0.25 hours and employed in an amount of from about 5 to about 30 weight percent water, based on the weight of the ore being treated.

16. The process of claim 10 wherein the means for removing elemental sulfur comprises solvent extraction.

17. The process of claim 16 wherein the solvent is selected from the group consisting of carbon tetrachloride, toluene, petroleum ether, acetone, methyl alcohol, ethyl alcohol, ether, carbon disulfide and liquid ammonia.

18. The process of claim 17 wherein the solvent is employed in an amount of at least about 0.5 liters of solvent per kilogram of ore.

19. The process of claim 18 wherein the solvent is petroleum ether.

20. The process of claim 14 wherein the gas is employed in an amount of 12 cubic meters per hour per metric ton of ore.

21. The process of claim 20 wherein the gas is nitrogen.

22. The process of claim 13 wherein the elemental sulfur concentration of the ore following the pretreatment is less than about 50 parts per million.

23. The process of claim 13 wherein the elemental sulfur concentration of the ore following the pretreatment is less than about 10 parts per million.

24. The process of claim 13 wherein the iron containing compound is employed in an amount of from about 1 to about 50 kilograms per metric ton of ore and the selective magnetic enhancement reaction is carried out at a temperature within a range of 50° C. less than the general decomposition temperature of the iron containing compound in a specific system for a period of time from about 0.15 to about 2 hours.

25. The process of claim 24 wherein the iron containing compound is an iron carbonyl and the treatment process is carried out at a temperature within a range of 15° C. less than the general decomposition temperature of the iron carbonyl in the specific system for the ore being treated.

26. The process of claim 24 wherein the mineral values are physically separated from the gangue by a magnetic separation process.

27. The process of claim 24 wherein the mineral values are physically separated from the gangue by an electrostatic technique.

28. In a process for the beneficiation of a metal sulfide ore selected from the group consisting of galena, molybdenite, sphalerite, bornite, cinnabar, arsenopyrite, smaltite, chalcocite, chalcopyrite, orpiment, pentlandite, stibnite and tetrahedrite or a metal oxide ore selected from the group consisting of bauxite, apatite and the metal oxides of Groups IIIB, IVB, VB, VIB, VIIB, VIIIB, IB, IIB and IVA, which contain elemental sulfur, by treating the ore with from about 1 to about 50 kilograms of an iron containing compound selected from the group consisting of ferrous chloride, ferric chloride, ferrocene, ferric acetylacetonate, ferrous acetylacetonate, and iron pentacarbonyl per metric ton of ore at a temperature within a range of 125° C. less than the general decomposition temperature of the iron containing compound in a specific system for the ore being treated for a period of time from about 0.15 to about 2 hours to cause the iron containing compound to react substantially at the surface of the metal sulfide or oxide particles to the substantial exclusion of the gangue particles so as to alter the surface characteristics of the metal values thereby causing a selective enhancement of the magnetic susceptibility of one or more metal sulfide or oxide values of the ore to the exclusion of the gangue in order to permit a magnetic separation between the values in gangue, the improvement comprising:

removing at least a portion of the elemental sulfur from the ore prior to its treatment with the iron containing compound.

29. The process of claim 28 wherein the means for removing the elemental sulfur comprises heating the ore to a temperature of from about 150° C. to about 350° C. for a time period of at least about 0.5 hours.

30. The process of claim 29 wherein the heat pretreatment step is conducted in the presence of a gas selected from the group consisting of nitrogen, steam, hydrogen, carbon monoxide, carbon dioxide, ammonia, methane, air, ethane, propane, butane, and other hydrocarbon compounds in the gaseous state at the pretreatment temperature.

31. The process of claim 30 wherein the gas is steam at a temperature from about 175° C. to about 250° C. for a time period of at least about 0.25 hours and employed in an amount of from about 10 to about 25 weight percent based on the weight of the ore being treated.

32. The process of claim 28 wherein the means for removing elemental sulfur comprises solvent extraction with the solvent being selected from the group consisting of carbon tetrachloride, petroleum ether, toluene, acetone, methyl alcohol, ethyl alcohol, ether, carbon disulfide and liquid ammonia.

33. The process of claim 32 wherein the solvent is petroleum ether which is employed in an amount of at least about 3 liters per kilogram of ore being treated.

34. The process of claim 29 or claim 31 wherein the iron containing compound is iron pentacarbonyl employed in an amount from about 2 to about 20 kilograms per metric ton of ore and the process is conducted at a temperature within a range of 15° C. less than the general decomposition temperature of the iron carbonyl in the specific system for a time period of from about 0.15 to about 2 hours and the heat pretreatment for sulfur removal is conducted at a temperature of from about 175° C. to about 250° C. for a time period of at least about 0.5 hours.

35. The process of claim 33 wherein the iron containing compound is iron pentacarbonyl employed in an amount of from about 2 to about 20 kilograms per metric ton of ore and the process is conducted at a temperature within a range of 15° C. less than a general decomposition temperature of the iron carbonyl in the specific system for the ore being treated for a time period of from about 0.15 to about 2 hours.

36. The process of claim 34 wherein the metal oxide ore is scheelite.

37. The process of claim 35 wherein the ore is sphalerite.

38. The process of claim 34 wherein the sulfide ore is selected from the group consisting of galena, molybdenite, bornite, cinnabar, arsenopyrite, smaltite, chalcocite, chalcopyrite, orpiment, pentlandite, stibnite and tetrahedrite.

39. The process of claim 38 wherein the sulfide ore is galena.

40. The process of claim 38 wherein the sulfide ore is stibnite.

41. The process of claim 38 wherein the sulfide ore is bornite.

42. The process of claim 38 wherein the sulfide ore is chalcocite.

43. The process of claim 38 wherein the sulfide ore is orpiment.

44. The process of claim 38 wherein the sulfide ore is pentlandite.

45. The process of claim 38 wherein the sulfide ore is cinnabar.

46. The process of claim 38 wherein the sulfide ore is arsenopyrite.

47. The process of claim 38 wherein the sulfide ore is smaltite.

48. The process of claim 38 wherein the sulfide ore is tetrahedrite.

49. The process of claim 30 wherein the gas is nitrogen and the ore is galena.

50. In a process for the beneficiation of sulfide ores and metal oxide ores from gangue, excluding coal, wherein the metal oxide ore is selected from the group consisting of bauxite, apatite, and the metal oxides of Groups IIIB, IVB, VB, VIB, VIIB, VIIIB, IB, IIB, and IVA, which contain elemental sulfur, wherein the ore is treated with an iron carbonyl under conditions which cause the iron carbonyl to react substantially at the surface of the metal sulfide or oxide particles to the substantial exclusion of the gangue particles so as to alter the surface characteristics of the metal values thereby causing a selective enhancement of the magnetic susceptibility of one or more metal sulfide or oxide values of the ore to the exclusion of the gangue in order to permit a physical separation between the values and the gangue, the improvement comprising:
removing at least a portion of the elemental sulfur from the ore prior to its treatment with the iron carbonyl.

51. The process of claim 50 wherein the means for removing the elemental sulfur comprises heating the ore to a temperature of from about 150° C. to about 350° C. for a time period of at least about 0.5 hours.

52. The process of claim 51 wherein the heat pretreatment step is conducted in the presence of a gas selected from the group consisting of nitrogen, steam, carbon monoxide, carbon dioxide, ammonia, air, methane, ethane, propane, butane and other hydrocarbon compounds which exist in the gaseous state at the pretreatment temperature.

53. The process of claim 52 wherein the gas is steam at a temperature from about 150° C. to about 350° C. for a time period of at least about 0.25 hours with from about 5 weight percent to about 30 weight percent water, based on the weight of the ore being treated.

54. The process of claim 53 wherein the means for removing elemental sulfur comprises solvent extraction with the solvent being selected from the group consisting of carbon tetrachloride, petroleum ether, toluene, acetone, methyl alcohol, ethyl alcohol, ether, carbon disulfide, and liquid ammonia.

55. The process of claim 54 wherein the solvent is petroleum ether which is employed in an amount of at least about 3 liters per kilogram of ore being treated.

56. The process of claim 51 or claim 52 wherein the elemental sulfur concentration following the pretreatment for the removal of elemental sulfur is less than about 50 parts per million.

57. The process of claim 54 wherein the elemental sulfur concentration following the pretreatment for the removal of elemental sulfur is less than about 50 parts per million.

58. The process of claim 51 or claim 54 wherein the metal sulfide ore is selected from the group consisting of galena, molybdenite, sphalerite, bornite, cinnabar, arsenopyrite, smaltite, chalcocite, chalcopyrite, orpiment, pentlandite, stibnite and tetrahedrite.

59. The process of claim 53 or claim 55 wherein the metal sulfide ore is selected from the group consisting of galena, molybdenite, bornite, cinnabar, arsenopyrite, smaltite, chalcocite, chalcopyrite, orpiment, pentlandite, stibnite and tetrahedrite.

60. The process of claim 51 or claim 52 wherein the metal oxide ore is scheelite.

61. The process of claim 16 wherein the elemental sulfur concentration of the ore following the pretreatment is less than about 10 parts per million.

62. The process of claim 16 wherein the iron containing compound is employed in an amount of from about 1 to about 50 kilograms per metric ton of ore and the selective magnetic enhancement reaction is carried out at a temperature within a range of 50° C. less than the general decomposition temperature of the iron containing compound in a specific system for the ore being treated for a period of time from about 0.15 to about 2 hours.

63. The process of claim 62 wherein the iron containing compound is an iron carbonyl and the treatment process is carried out at a temperature within a range of 15° C. less than the general decomposition temperature of the iron carbonyl in the specific system for the ore being treated.

64. The process of claim 62 wherein the mineral values are physically separated from the gangue by a magnetic separation process.

65. The process of claim 62 wherein the mineral values are physically separated from the gangue by an electrostatic technique.

66. The process of claim 35 wherein the sulfide ore is selected from the group consisting of galena, molybdenite, bornite, cinnabar, arsenopyrite, smaltite, chalcocite, chalcopyrite, orpiment, pentlandite, stibnite and tetrahedrite.

67. The process of claim 66 wherein the sulfide ore is galena.

68. The process of claim 66 wherein the sulfide ore is stibnite.

69. The process of claim 66 wherein the sulfide ore is bornite.

70. The process of claim 66 wherein the sulfide ore is chalcocite.

71. The process of claim 66 wherein the sulfide ore is orpiment.

72. The process of claim 66 wherein the sulfide ore is pentlandite.

73. The process of claim 66 wherein the sulfide ore is cinnabar.

74. The process of claim 66 wherein the sulfide ore is arsenopyrite.

75. The process of claim 66 wherein the sulfide ore is smaltite.

76. The process of claim 66 wherein the sulfide ore is tetrahedrite.

* * * * *